United States Patent
McPhillips

(10) Patent No.: US 6,566,623 B2
(45) Date of Patent: May 20, 2003

(54) METHOD AND APPARATUS FOR ELECTRIC DISCHARGE MACHINING WITH A DRESSING TOOL

(75) Inventor: Richard B. McPhillips, Williamsville, NY (US)

(73) Assignee: Harvest Precision Components, Inc., Williamsville, NY (US)

( * ) Notice: Subject to any disclaimer, the term of this patent is extended or adjusted under 35 U.S.C. 154(b) by 0 days.

(21) Appl. No.: 09/870,351

(22) Filed: May 30, 2001

(65) Prior Publication Data

US 2002/0179572 A1 Dec. 5, 2002

(51) Int. Cl.[7] .............................................. B23H 1/00
(52) U.S. Cl. ................................... 219/69.17; 219/69.2
(58) Field of Search ........................... 219/69.15, 69.17, 219/69.2

(56) References Cited

U.S. PATENT DOCUMENTS

| 3,122,628 | A | * | 2/1964 | Inoue |
| 3,338,808 | A | * | 8/1967 | Johnson |
| 3,398,253 | A | * | 8/1968 | Rye |
| 4,001,538 | A |   | 1/1977 | Michalski |
| 4,236,985 | A | * | 12/1980 | Grodzinsky et al. ..... 219/69.17 |
| 4,628,171 | A |   | 12/1986 | Colby et al. |
| 5,006,685 | A | * | 4/1991 | Hatano et al. ............. 219/69.2 |
| 5,045,664 | A | * | 9/1991 | Nakagawa et al. ........ 219/69.2 |
| 5,049,715 | A | * | 9/1991 | Tanaka |
| 5,396,040 | A | * | 3/1995 | Girardin .................... 219/69.2 |
| 5,561,336 | A |   | 10/1996 | Girardin |
| 5,804,789 | A | * | 9/1998 | Saito et al. ............... 219/69.17 |

FOREIGN PATENT DOCUMENTS

| JP | 63-7233 A | * | 1/1988 | ............. 219/69.15 |
| JP | 4-114733 A | * | 4/1992 | |

* cited by examiner

Primary Examiner—Geoffrey S. Evans
(74) Attorney, Agent, or Firm—Stephen B. Salai, Esq.; Roger Aceto, Esq.; Harter, Secrest & Emery LLP

(57) ABSTRACT

An electrical discharge machining (EDM) apparatus and method is disclosed that utilizes a rotating electrode for performing the EDM operation to form a desired profile in the work piece surface. A dressing tool located at a side of the rotating electrode opposite from the work piece is operable to dress the surface of the rotating electrode. Operation of the dressing tool is controlled in part by a monitor that monitors changes in the character and condition of the surface of the rotating electrode from certain starting parameters and initiates a dressing operation as needed to restore the starting parameters.

20 Claims, 2 Drawing Sheets

METHOD AND APPARATUS FOR ELECTRIC DISCHARGE MACHINING WITH A DRESSING TOOL

TECHNICAL FIELD

The present invention relates to apparatus and method for electrical discharge machining using a rotating electrode for machining a desired profile into the surface of a conductive work piece.

BACKGROUND OF THE INVENTION

Electrical discharge machining (EDM) is a well-known technique for the precision machining of hardened metal alloys and conductive ceramic composite materials (such as a cobalt-tungsten carbide among others) that are difficult or impossible to machine by more conventional methods. In EDM, the cutting tool is an electrode attached to a power supply. Material is gently removed from the work piece by striking a microscopically small spark between the forming tool and the electrically conductive work piece. To do this, the electrode is brought close to the surface of the work piece so an electric discharge or spark is generated across the gap between the electrode and the work piece. As the discharge enters the work piece, several molecules of the material of the work piece are ejected from the work piece surface. The material removed by the spark normally is flushed away by a dielectric liquid. In this fashion, the work piece can be machined to a desired shape.

One drawback of EDM is that the electrode erodes over time. This erosion of the electrode will change the dimensions of the eventual machined shape. Changing the electrode often or building the expected erosion into the starting electrode are ways to compensate for the erosion.

A common form of EDM and the process featuring the highest rate of material removal employs a wire electrode about 0.008 to 0.015 inches in diameter. The wire is connected to a spark generator and is moved in a direction normal to its longitudinal axis to cut into the work piece. In addition, the wire electrode is continuously indexed in the direction of its axis so as to present the same wire diameter to the work piece.

An EDM process using a wire electrode is capable of a dimensional precision of 0.001 to 0.00005 inches under ideal set up conditions. Flushing debris from about the electrode is accomplished by pumping the dielectric liquid directly into the cut. Reliance is on the axial movement of the wire to carry the flushing liquid into the cut for sweeping away the material ejected from the work piece.

Rotating the electrode also is known. For example, U.S. Pat. No. 4,001,538 discloses rotating the electrode about is longitudinal axis and discharging sparks from an end face of the electrode to smooth the surface of the work piece. Preferably the electrode is arranged with its rotational axis disposed at a slight angle from the vertical of between about 85° to 89.40° as measured from the plane surface of the work piece. The shape of the working end of the rotating and inclined solid cylindrical electrode is described as "blunt conical". The work piece is disposed in a bath of a dielectric liquid and the shape of the blunt conical end aids in flushing away debris and material removed from the work piece.

Another device using a rotating electrode for making threaded and non threaded bores is disclosed in U.S. Pat. No. 4,628,171 and a device for supplying an electric current to a rotating electrode is disclosed in U.S. Pat. No. 5,561,336

In EDM, controlling the frequency, voltage, current and wave shape of the spark discharge is known to control the surface finish imparted to the work piece. In this respect, there is a given amount of energy available per unit time depending upon the current applied to the electrode. For a greater number of sparks per second (and a reduction of the current and voltage of that spark) there will be less energy per spark so the amount of material removed per spark will be less. Thus, if a smooth surface is desired, a higher spark frequency (and reduced energy content of each spark) and longer work time is used as opposed to a rapid machining operation which uses a lower frequency to remove larger amounts of the work piece with each discharge.

EDM requires that the work piece be conductive. Accordingly, working certain ceramic materials including silicon carbide is particularly difficult in part because of the poor conductivity of these materials. Ceramics and silicon carbide have been used for surgical instruments such as scalpels and other cutting instruments and the sharpening of these materials to provide a cutting edge has been done by conventional means (such as Diamond Grinding) in part because of the conductivity issues. Conductivity problems may be overcome by known doping techniques to incorporate a conductive metal into the crystalline structure of the ceramic. While silicon carbide (SiC) can be made conductive, a drawback to machining this material by EDM is that SiC readily combines with free oxygen to form $SiO_2$ on the surface of the work piece. Since $SiO_2$ is an insulator, a layer of $SiO_2$ only Angstroms thick, on the surface of the work piece will adversely effect the machining process. Any build up of $SiO_2$ on the surface of the electrode also will interfere with the EDM process.

Accordingly, in view of the current state of the art there is a need for EDM apparatus and process for working harden metals and conductive ceramics to improve surface finish of the work piece. There also is a need for an EDM apparatus and method capable of dealing with the erosion of the electrode. There further is a need for an EDM apparatus and method for dealing with the build up of contaminants and electrical insulating process by-products on the electrode. This is particularly the case where the work piece is a silicon carbide and the contaminant includes $SiO_2$.

SUMMARY OF THE INVENTION

In the present invention, the electrode is circular in cross section and may include such structures as a right cylinder, disk, wheel or conical body. The electrode also may be generally cylindrical with a desired profile that is symmetrical about the longitudinal axis of the electrode. The electrode is arranged to spin about its longitudinal axis and is arranged so that successive portions of the electrode periphery are carried into close proximity to the surface of the work piece. At the same time, portions of the electrode periphery on an opposite side are carried away from the surface of the work piece. For example, in the case of a cylindrical electrode, the axis of rotation may be oriented generally parallel to the surface of the work piece or within a few degrees of being parallel to the work piece surface so substantially the entire electrode is used in the EDM process. In the case of a conical electrode, the axis of rotation may be disposed at an angle to the surface of the work piece so the surface of the electrode is substantially parallel to the surface of the work piece.

The electrode is rotatably supported on high quality bearings and movement of the electrode is controlled such that the surface of the rotating electrode will approach the work piece surface in a predictable and controlled manner without plunging into the work piece. In this manner the surface of the work piece is machined by the adjacent portion of the electrode while a second portion of the electrode is remote from the work piece. In a preferred embodiment, the surface of the electrode is provided with a shape or contour that is machined into the surface of the work piece.

As the electrode spins about its longitudinal axis, the desired contour is formed in the work piece surface. A spinning electrode also allows for the use of an in situ dressing or sharpening of the electrode to compensate for the erosion of the electrode or to remove impurities that may build up on the electrode surface thereby extending the life of the electrode.

As the electrode spins in close proximity to the work piece surface, any suitable position monitoring system is used to monitor the position of the electrode for precise machining. Such a system may include for example a laser, optical system or video camera among others. The feed back from the position monitor and feedback from the electrical monitoring of the rate, duration, voltage and current of the pulse are all used as input parameters for computer assisted programming required for precision control of the electrode.

The spinning electrode may be used as the vehicle to carry a dielectric liquid between the electrode and the work piece to flush away the by-products of the machining operation by accelerating the flow of the dielectric liquid into the cutting area. Grooves can be provided in the surface of the electrode to enhance the pumping action forcing liquid into the cutting area. A pathway also may be provided through the electrode to facilitate the conduct of the dielectric liquid into the cutting area. In the case of a silicon carbide work piece, the dielectric liquid preferably is oil to retard the development of $SiO_2$ on the surface of the work piece.

As the electrode spins one portion of the electrode surface is carried towards and into close proximity to the surface of the work piece while an opposite portion of the electrode surface moves away from the work piece. A suitable monitor can be arranged to monitor the profile of the electrode surface. Should the profile of the electrode change over time due to erosion or the build up of contaminants, the monitor sees the change. At such time as the change in the electrode surface become unacceptable, the electrode surface can be dressed to restore the desired profile. This is accomplished by operating a dressing tool to contact that portion of the spinning electrode surface that is spaced or remote from the work piece where the EDM is occurring.

The EDM process using a spinning electrode in accordance with the present invention preferably is used to provide a sharp edge, free of burrs or damage common to diamond or other abrasive grinding techniques. A preferred use is to sharpen ceramic or metal or harden metal blanks as may be used for surgical cutting instruments and the like. For example, blades can be formed of an electrically conductive ceramic, metal hardened metal, metal matrix composite, electrically conductive polymer or similar electrically conductive material that are near to a desired shape or profile of a finished blade. The spinning electrode, provided with a profile that is a positive (or reverse image) of the desired machined shape, then is used to perform the machining operation to provide the final shape.

Accordingly, the present invention may be characterized in one aspect thereof by an electro discharge machining (EDM) apparatus for removing material from a conductive work piece including:

a) a rotatable electrode having a generally circular cross section, the electrode being arranged for rotation about its longitudinal axis;

b) drive means for continuously rotating the electrode about its longitudinal axis to bring successive portions of the electrode surface into close proximity to the surface of the work piece such that electrical discharge machining of the work piece surface occurs at one portion of the electrode surface while another portion of the electrode outer surface is brought to a location remote from the work piece surface;

c) a dressing tool at the remote location for dressing the electrode surface;

d) a monitor for monitoring and indicating changes in the character and condition of the electrode surface from certain starting parameters; and e) the dressing tool being operable in response to a change in the character and condition of the electrode surface for dressing the electrode surface and restoring the starting parameters.

In another aspect, the present invention may be characterized by an electric discharge machining process for removing material from a surface of a conductive work piece comprising:

a) providing a rotatable electrode having a generally circular cross section;

b) arranging the electrode for rotation about its longitudinal axis;

c) continuously rotating the electrode about its axis to bring successive portions of the electrode surface into close proximity to the surface of the work piece such that electrical discharge machining of the work piece surface occurs at one portion of the electrode surface while another portion of the electrode surface is brought to a location remote from the work piece surface;

d) monitoring changes in the character and condition of the electrode surface from certain starting parameters; and e) dressing the portion of the electrode surface that is brought to said remote location by said rotating so as to restore the starting parameters.

DETAILED DESCRIPTION OF THE INVENTION

Figure 1:
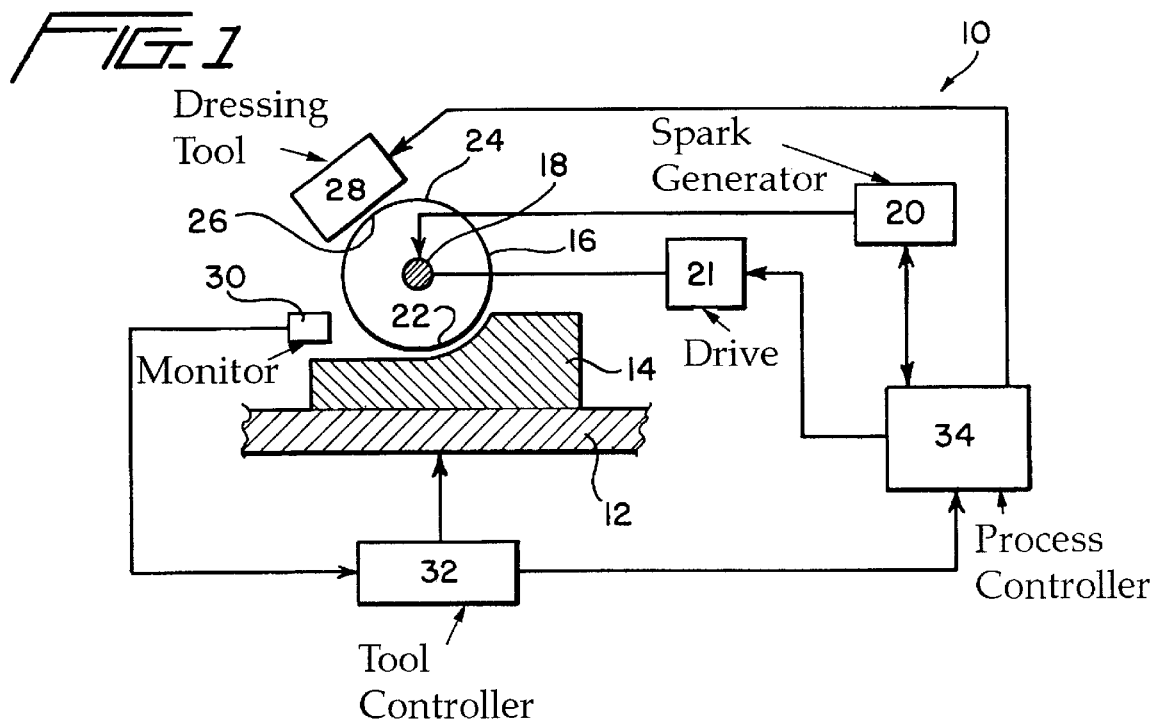
FIG. 1 is a schematic drawing showing an EDM system according to the present invention.

Referring to the drawings, FIG. 1 shows an EDM system according to the present invention generally indicated at 10. The system includes a worktable 12 for supporting a work piece 14. Preferably the worktable 12 is controllably movable in an X-Y (horizontal) plane and most preferably it is movable both horizontally and vertically. Supported above the worktable is an EDM electrode 16. The electrode has a circular cross section and is supported on precision bearings (not shown) to permit rotation of the electrode about an axis 18 that extends generally parallel or near parallel to the work piece. The bearings include conventional slip rings to permit communication of the electrode 16 to a spark generator 20. The spark generator controls the impedance of the system to maximize the power transfer to the electrode and to the work piece. Preferably the spark generator is set to generate high frequency sparks to provide a slow machining time and a smoother surface finish as opposed to a rapid machining operation which uses a lower frequency to remove larger amounts of the work piece with each discharge.

A drive 21 is provided for spinning the electrode 16 about it axis 18 at a speed of between about 25 to 2500 rpm. During the course of rotation, a first portion 22 of the electrode surface is brought into close proximity to the work piece while a second portion 26 of the electrode surface is brought to a position remote from the work piece. Adjacent the second portion of the electrode surface is a dressing tool 28. The dressing tool is arranged for selective operation to dress a peripheral surface 24 of the spinning electrode as set out further hereinbelow.

Also included in the EDM system is a monitor 30 located to keep track of the position of the spinning electrode as well as the shape and condition of the surface of the electrode. The monitor may be a video camera, laser, optical scanner or any suitable device capable of recognizing a change in the state or condition of the electrode surface. The output of the monitor is connected to a tool controller 32. The tool controller integrates the spark rate and the input from the monitor 30 and is operatively connected to both the worktable 12 and the electrode. The tool controller acts in response to its inputs to change the position of the worktable and/or the electrode as needed to provide proper dimensional control of the work piece. A further function of the tool controller is to receive input from the monitor to track the condition of the electrode, such as its profile.

Completing the system is a process control computer 34 that is connected to the tool controller 32, spark generator 20 and the electrode dressing tool 28. The process controller 34 receives input from the tool controller 32 to increase or decrease the spark rate to speed or slow the EDM process as desired. The process control computer also may act to increase or decrease the spark rate to correct for some out of standard condition picked up by the monitor 30. The process controller 34 further operates the dressing tool 28 in response to an input from the tool controller indicating that the electrode 16 requires dressing or sharpening to restore a desired profile.

In operation the work piece 14 is fixed to the worktable 12 and the worktable is moved by the tool controller 32 to bring the work piece into a proper alignment with the electrode. The drive 21 is activated to spin the electrode about its longitudinal axis 18 and the spark generator 20 is activated to energize the electrode 16. As the spinning electrode is brought into close proximity with the work piece, material is eroded from the work piece surface by EDM to bring the surface of the work piece to the desired shape. During the EDM process, the tool controller may increase or decrease the spark rate to speed or slow the EDM process as desired. Also during the EDM process, monitor 30 monitors the shape and condition of the electrode. Changes in the electrode are communicated to the tool controller 32.

At the time the tool controller 32 recognizes that the peripheral surface 24 no longer is within operative parameters, it communicates this state to the process control computer 34. The process control computer then initiates the sequence for dressing the surface of the electrode 16 to return the electrode to the correct operative parameters. For example, the electrode may itself be eroded by the EDM process or changes may occur in the shape or conformation of the electrode surface so the electrode no longer is configured to impart the desired profile into the work piece surface. When this occurs, the electrode is moved slightly away from the work piece to stop the EDM process. While the electrode continues to spin, the dressing tool is brought into position to dress the peripheral surface 24. The dressing tool 28 may be a grindstone or the like that bears against the electrode. As an alternative, the dressing tool itself may be an electrode that performs an EDM process to dress the peripheral surface 24 of the spinning electrode 16. Once the surface of the spinning electrode restored to proper parameters, the process control computer 34 returns the electrode to a position for continuing the EDM process on the work piece.

Figure 2A:
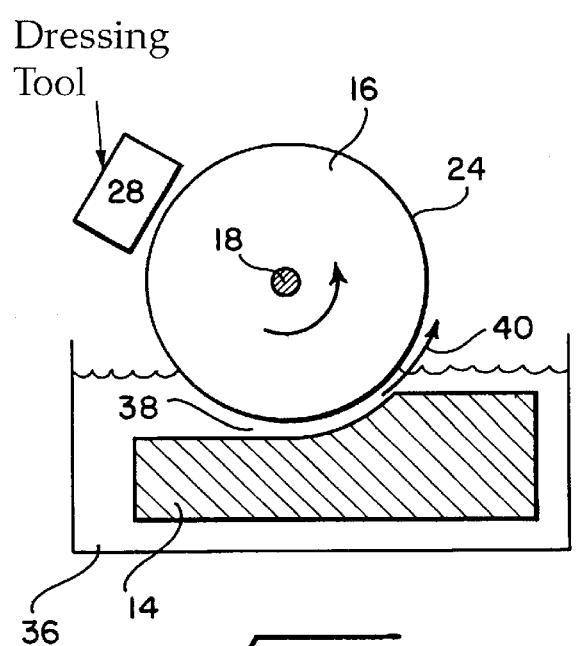
FIGS. 2a and 2b are schematic representations showing the front and side elevation views respectively of a spinning electrode according to the present invention.
Figure 2B:
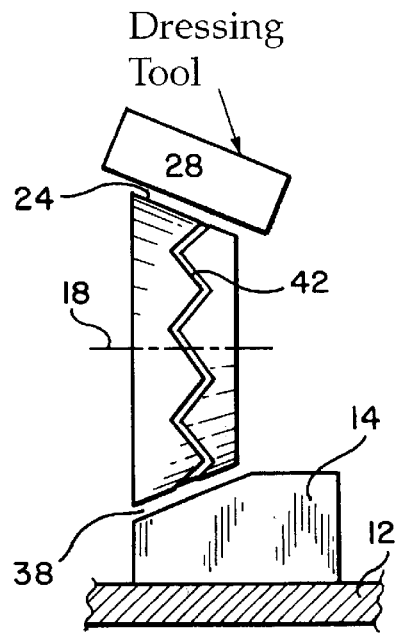

FIG. 2a shows the work piece 14 as being in a bath 36 of dielectric liquid, preferably dielectric oil. As the electrode 16 spins about its axis 18, the peripheral outer surface 24 of the electrode carries the dielectric liquid into the gap 38 between the work piece and the electrode. Sub micron particles 40 ejected from the work piece by the EDM process are swept clear from the work area by the spinning action of the electrode. As shown in FIG. 2b, the peripheral surface 24 of the electrode may be provided with grooves or channels 42 to facilitate the movement of the dielectric liquid into the gap 38 between the electrode and the work piece. The portions of the electrode forming the grooves and channels also provide a plurality of locations from which sparks can be discharge to the work piece so there is a high spark frequency. In an alternate embodiment, the electrode may be provided with internal passages (not shown) that communicate with the groove 42 for conducting dielectric liquid from an external supply through the electrode and into the groove.

FIG. 2b also shows that the outer peripheral surface 24 of the electrode can be provided with a profile or contour that is machined into the surface of the work piece 14 by the EDM process. The profile as shown may be used for machining the work piece 14 to a knife blade. The electrode may range in diameter from 0.5 to 4 or more inches in diameter and have a thickness at its operative end of 0.10 to 6.0 inches. It also is possible for the electrode to feature a contoured profile. For example, the electrode may be conical with a smooth continuously tapered profile or it may have a profile that is shaped or irregular along its length but circular in cross section.

Figure 3:
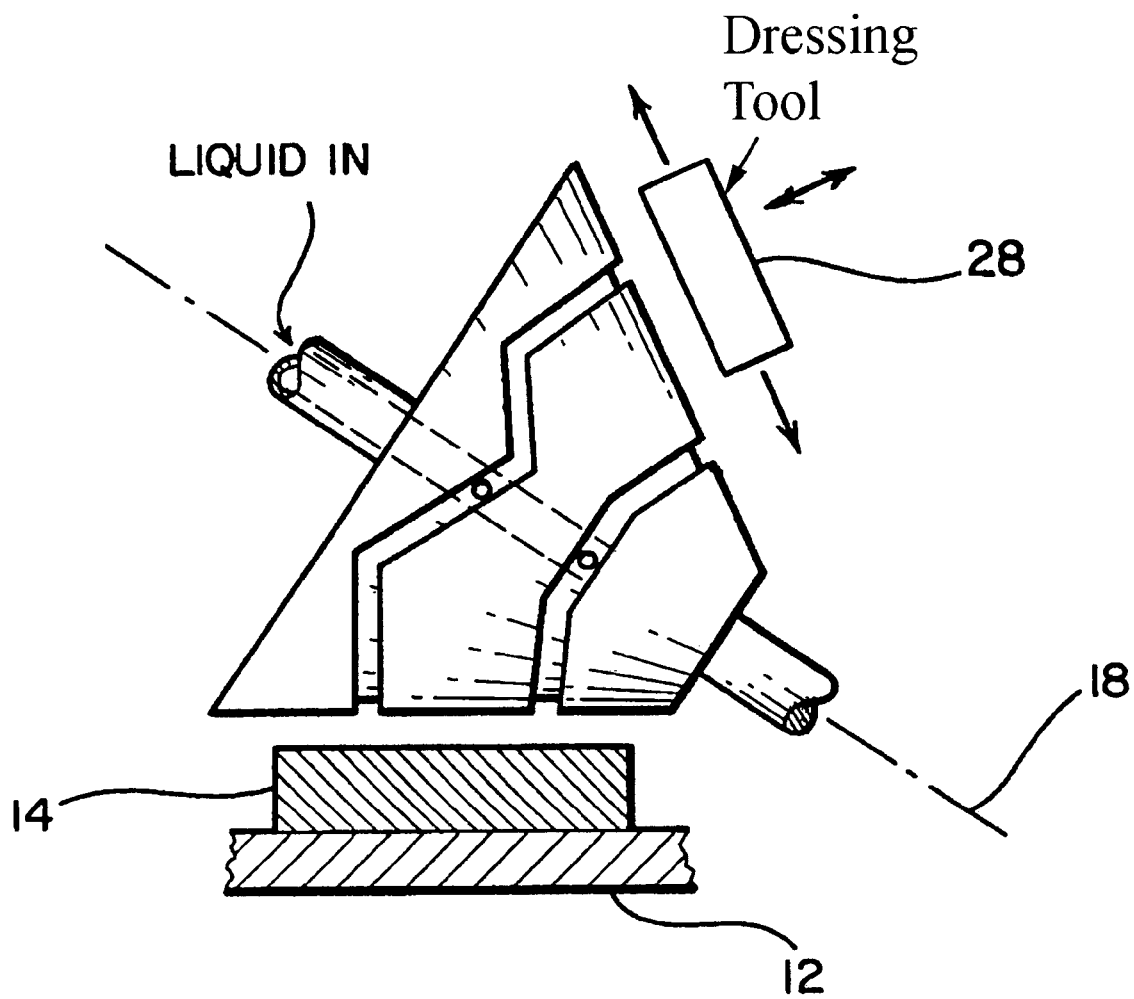
FIG. 3 is a schematic representation showing a side elevation view of another embodiment of the invention.

As shown in the figures, the rotational axis 18 of the electrode 16 is oriented generally parallel to the surface of the work piece to allow substantially the entire periphery of the electrode to sweep into the work piece. This orientation is not essential and the axis may be within a few degrees of being parallel to the work piece surface. For example the electrode as shown in FIG. 2b can be more cylindrical wherein the bevel shape to the work piece is accomplished by having the axis of the electrode disposed at angle to the work piece surface. Also, in the case of a conical electrode, the axis of rotation may be oriented at a steeper angle with respect to the work piece surface so as to machine the work piece with a flat profile as shown in FIG. 3. It is important only that a portion of the surface of the electrode pass through a location remote from the work piece so that contact can be made with a dressing tool.

Thus it should be appreciated that the present invention provides an improved EDM apparatus and process for working harden metals and conductive ceramics. The use of a rotating electrode together with a high spark frequency provides the work piece surface with a smooth finish. The present invention further provides for the monitoring and dressing of the electrode to compensate for the erosion of the electrode. In the case where the work piece is a silicon carbide ceramic, dressing the tool in accordance with the present invention prevents an undesirable buildup of $SiO_2$ on the work piece.

Having described the invention in detail, what is claimed as new is:

1. Electrical discharge machining apparatus for removing material fl-em a conductive work piece comprising:
   a) a rotatable electrode having a generally circular cross section including a peripheral surface, said electrode being arranged for rotation about its longitudinal axis;
   b) drive means for continuously rotating said electrode about its longitudinal axis to bring successive portions of said peripheral surface into close proximity to the surface of the work piece such that electrical discharge machining of the work piece surface occurs while other portions of said electrode peripheral surface rotate through a location remote from the work piece surface;
   c) a dressing tool at said remote location for dressing said electrode peripheral surface;
   d) a monitor for monitoring and indicating changes in the character and condition of said electrode peripheral surface from certain starting parameters; and
   e) said dressing tool being operable on said other portions of said electrode peripheral surface as said other portions rotate through said remote location in response to a change in the character and condition of said electrode peripheral surface for dressing said electrode peripheral surface and restoring said starting parameters.

2. Electrical discharge machining apparatus as in claim 1 wherein said electrode is generally cylindrical and is arranged for rotation about an axis lying generally parallel to a surface of the work piece.

3. Electrical discharge machining apparatus as in claim 1 wherein:
   a) said monitor has an output representing a change in the condition of said electrode peripheral surface; and
   b) a process controller operatively connected to said monitor and to said dressing tool for stopping the electrical discharge machining while continuing the rotation of said electrode and operating said dressing tool in response to an input derived from said monitor indicating that said electrode peripheral surface requires dressing or sharpening to restore a desired profile.

4. Electrical discharge machining apparatus as in claim 1 wherein said dressing tool is a grindstone that is brought into physical contact with said electrode peripheral surface to dress said surface.

5. Electrical discharge machining apparatus as in claim 1 wherein said dressing tool is itself an electrode for dressing said peripheral surface of said rotatable electrode by electrical discharge machining.

6. Electrical discharge machining apparatus as in claim 1 wherein the work piece surface is disposed in a bath of a dielectric liquid.

7. Electrical discharge machining apparatus as in claim 6 wherein said rotatable electrode peripheral surface is provided with a groove for channeling dielectric liquid between said rotatable electrode and the surface of the work piece.

8. Electrical discharge machining apparatus as in claim 7 wherein said electrode includes an internal passage for conducting dielectric liquid through said electrode to said groove.

9. Electrical discharge machining apparatus as in claim 1 wherein said rotatable electrode has a diameter of between 0.5 to 4.0 inches.

10. Electrical discharge machining apparatus as in claim 1 wherein said work piece is a knife blank of silicon carbide and said rotatable electrode has an outer surface arranged to form a knife edge on said blank.

11. Electrical discharge machining apparatus as in claim 1 wherein said electrode has a desired profile that is irregular along its length and symmetrical about its longitudinal axis for forming a like desired profile in the work piece surface.

12. Electrical discharge machining apparatus for removing material from a conductive work piece comprising:
   a) an electrode arranged for rotation about an axis lying generally parallel to a surface of the work piece, said electrode having a generally cylindrical surface provided with a desired profile;
   b) means for continuously rotating said electrode about its axis to bring successive portions of the electrode surface into close proximity to the surface of the work piece such that electrical discharge machining of the surface of the work piece occurs while other portions of said electrode surface rotate through a location remote from the surface of the work piece;
   c) a dressing tool supported at a side of the electrode remote from the surface of the work piece for dressing said electrode surface;
   d) means for monitoring and indicating changes in the character and condition of said electrode surface from certain starting parameters; and
   e) means for operating said dressing tool in response to a change in the character and condition of said electrode surface to dress said electrode outer surface and restore said starting parameters wherein said dressing tool operates on said other portions of said electrode surface as said other portions rotate through said remote location.

13. An electric discharge machining process for removing material from a surface of a conductive work piece comprising:
   a) providing a rotatable electrode having a generally circular cross section;
   b) arranging said electrode for rotation about an axis that is normal to the circular cross section;
   c) continuously rotating the electrode about its axis to bring successive portions of the electrode surface into close proximity to the surface of the work piece such that electrical discharge machining of the work piece surface occurs while other portions of the electrode surface are brought to a location remote from the work piece surface;
   d) monitoring changes in the character and condition of the electrode surface from certain starting parameters; and
   e) dressing the other portions of the electrode surface that are brought to said remote location by said rotating so as to restore the starting parameters.

14. A process as in claim 13 wherein the electrode is generally cylindrical and said rotating occurs about an axis that is generally parallel to the surface of the work piece.

15. A process as in claim 13 comprising:
   a) forming an input responsive to changes in the character and condition of the electrode surface from certain starting parameters; and
   b) dressing the surface of the electrode in response to said input.

16. A process as in claim 15 comprising supporting a dressing tool adjacent the remote location and pressing the dressing tool against the surface of the rotating electrode in response to said input.

17. A process as in claim 15 comprising dressing the surface of the rotating electrode by electrical discharge machining.

18. A process as in claim 13 comprising disposing the work piece surface in a bath of dielectric liquid.

19. A process as in claim 18 wherein the rotating electrode surface is provided with a groove and channeling the dielectric liquid through the groove to the space between the work piece surface and the outer surface of the rotating electrode.

20. An electric discharge machining process for removing material from a surface of a conductive work piece comprising:
   a) arranging an electrode for rotation about an axis lying generally parallel to a surface of a work piece, the electrode having a generally cylindrical surface provided with a desired profile;
   b) continuously rotating the electrode about its axis to bring successive portions of the electrode surface into close proximity to the surface of the work piece such that electrical discharge machining of the work piece surface occurs while other portions of the electrode surface rotate through a location remote from the work piece surface;
   c) supporting a dressing tool adjacent said remote location for dressing the electrode surface;
   d) monitoring changes in the character and condition of the electrode surface from certain starting parameters; and
   e) interrupting said electrical discharge machining in response to a change in the character and condition of the electrode surface while continuing said rotating of the electrode and operating the dressing tool for dressing the electrode surface to restore the starting parameters.

* * * * *

UNITED STATES PATENT AND TRADEMARK OFFICE
CERTIFICATE OF CORRECTION

| | |
|---|---|
| PATENT NO. | : 6,566,623 B2 |
| DATED | : May 20, 2003 |
| INVENTOR(S) | : McPhillips, Richard B. |

It is certified that error appears in the above-identified patent and that said Letters Patent is hereby corrected as shown below:

Column 7,
Line 11, "fl-em" should read -- from --.

Signed and Sealed this

Fifteenth Day of July, 2003

JAMES E. ROGAN
*Director of the United States Patent and Trademark Office*